(12) United States Patent
Uozu et al.

(10) Patent No.: US 8,939,752 B2
(45) Date of Patent: *Jan. 27, 2015

(54) MOLD, PROCESS FOR PRODUCING MOLD, AND PROCESS FOR PRODUCING SHEET

(75) Inventors: Yoshihiro Uozu, Kanagawa (JP); Eiko Okamoto, Hiroshima (JP); Katsuhiro Kojima, Hiroshima (JP); Satoshi Sakuma, Kanagawa (JP); Hideki Masuda, Kanagawa (JP); Takashi Yanagishita, Kanagawa (JP)

(73) Assignees: Mitsubishi Rayon Co., Ltd., Tokyo (JP); Kanagawa Academy of Science and Technology, Kanagawa (JP)

( * ) Notice: Subject to any disclaimer, the term of this patent is extended or adjusted under 35 U.S.C. 154(b) by 387 days.

This patent is subject to a terminal disclaimer.

(21) Appl. No.: 12/308,746

(22) PCT Filed: Jun. 28, 2007

(86) PCT No.: PCT/JP2007/063000
§ 371 (c)(1),
(2), (4) Date: Dec. 23, 2008

(87) PCT Pub. No.: WO2008/001847
PCT Pub. Date: Jan. 3, 2008

(65) Prior Publication Data
US 2009/0194914 A1 Aug. 6, 2009

(30) Foreign Application Priority Data

Jun. 30, 2006 (JP) .................................. 2006-181543

(51) Int. Cl.
*C25D 11/12* (2006.01)
*B29C 33/38* (2006.01)
(Continued)

(52) U.S. Cl.
CPC ............. *B29C 33/3842* (2013.01); *B29C 33/38* (2013.01); *B29C 35/0888* (2013.01);
(Continued)

(58) Field of Classification Search
USPC .................................. 425/115, 177, 385, 406
See application file for complete search history.

(56) References Cited

U.S. PATENT DOCUMENTS 6,214,738 B1 * 4/2001 Aiba et al. ..................... 438/707
6,476,409 B2 * 11/2002 Iwasaki et al. .................. 257/13
(Continued)

FOREIGN PATENT DOCUMENTS

EP 1643546 A2 * 4/2006
JP 11-198273 7/1999
(Continued)

OTHER PUBLICATIONS

PCT International Preliminary Report dated Jan. 29, 2009.*
Extended European Search Report (Application No. 07767794.6), dated Feb. 7, 2014.
Hideki Masuda and Masahiro Satoh, "Fabrication of Gold Nonodot Array Using Anodic Porous Alumina as an Evaporation Mask," Jpn. J. Appl. Phys., vol. 35 (1996), Pt. 2, No. 1B. pp. L-126-L-129.

*Primary Examiner* — Atul P. Khare
(74) *Attorney, Agent, or Firm* — Morgan, Lewis & Bockius LLP

(57) ABSTRACT

A mold comprising alumina having a microscopic pattern, in which distances between adjacent recesses or salients therein are not longer than wavelength of visible light, formed by anodic oxidation on a surface of an aluminum pre-mold without a rolling mark, wherein height or depth difference at a crystal grain boundary is 300 nm or less.

21 Claims, 3 Drawing Sheets

(51) Int. Cl.
*B29C 59/04* (2006.01)
*C25D 1/10* (2006.01)
*C25D 11/16* (2006.01)
*C25D 1/20* (2006.01)
*C25D 11/04* (2006.01)
*C25D 1/00* (2006.01)
*G02B 1/11* (2006.01)
*B29C 35/08* (2006.01)
*B29C 59/02* (2006.01)

(52) U.S. Cl.
CPC ......... *B29C59/046* (2013.01); *B29C 2059/023* (2013.01); *C25D 1/10* (2013.01); *C25D 11/12* (2013.01); *C25D 11/16* (2013.01); *G02B 1/118* (2013.01); *C25D 1/20* (2013.01); *C25D 11/045* (2013.01); *C25D 1/006* (2013.01)
USPC ........... 425/385; 425/115; 264/219; 205/121; 205/124; 205/324

(56) References Cited

U.S. PATENT DOCUMENTS

| | | | |
|---|---|---|---|
| 2003/0077441 A1* | 4/2003 | Kobayashi et al. | 428/349 |
| 2006/0050387 A1* | 3/2006 | Arakawa et al. | 359/491 |
| 2007/0159698 A1* | 7/2007 | Taguchi et al. | 359/586 |

FOREIGN PATENT DOCUMENTS

| | | |
|---|---|---|
| JP | 2001-264520 | 9/2001 |
| JP | 2005-035119 | 2/2005 |
| JP | 2005-156615 | 6/2005 |
| JP | 2005-156695 | 6/2005 |
| JP | 2005156695 A * | 6/2005 |
| JP | 2006-124827 | 5/2006 |
| WO | WO 2006059686 A1 * | 6/2006 |

* cited by examiner

MOLD, PROCESS FOR PRODUCING MOLD, AND PROCESS FOR PRODUCING SHEET

TECHNICAL FIELD

The present invention relates to a mold for transcribing a microscopic pattern, a process for producing the mold, and a process for producing a sheet having the microscopic pattern using the mold.

BACKGROUND ART

The benefit of a material having a microscopic pattern with a period not larger than a wavelength of visible light on the surface has been recognized recently due to its functionalities, such as an antireflection function or a lotus effect. Especially, a steric structure called as a moth-eye structure is known as an effective antireflection means due to gradual increase from a refractive index of air to a refractive index of a material.

As a process for forming a microstructure on a material surface, direct fabrication of the material is possible, however generally a process of producing a mold with a negative microstructure and transcribing the same onto the material is superior in terms of productivity and economy. As the process for forming a microscopic pattern, an electron beam lithography and laser interference lithography have been long known, and anodic oxidized porous alumina has recently drawn attention, with which a mold can be produced more easily (e.g. Patent Document 1).

For imparting the microstructure shape to the material surface as described above, a large area mold with high economical efficiency, or a mold enabling continuous production with high productivity and economy is often used.

A process including forming a microscopic pattern by lithography, replicating the same to produce metallic stampers, assembling a plurality of the same to cover a large area and attaching the same onto a roll (e.g. Patent Document 2), or a process including forming a microscopic pattern by lithography on an inner surface of a hollow cylindrical original mold, forming a metal layer by electroforming, removing the original mold and inserting a support roll for supporting (e.g. Patent Document 3) have been proposed.

Patent Document 1: Japanese Patent Laid-Open No. 2005-156695
Patent Document 2: Japanese Patent Laid-Open No. 2001-264520
Patent Document 3: Japanese Patent Laid-Open No. 2005-35119

DISCLOSURE OF THE INVENTION

Problems to be Solved by the Invention

However, production of a large area mold or a roll mold having a microscopic pattern with a period not larger than a wavelength of visible light is not an easy task, and according to the method of Patent Document 2, a joint line cannot be removed completely by welding and there remains a problem of low yield despite the advantage of a roll mold.

Meanwhile, according to the method of Patent Document 3, although the joint line is eliminated, fabricating a microscopic pattern not larger than the wavelength of visible light over a large area by a lithography process is difficult, and therefore there remains a problem that producing a roll mold with a microscopic pattern not larger than the wavelength of visible light is difficult. Another problem was a high production cost because of the complexity of the process requiring many steps.

The process according to Patent Document 1 is a good simple process for producing a mold, but no reference has been made to a macroscopic unevenness of the obtained mold. With an aluminum material manufactured by rolling, a rolling mark may not be removed by mirror finishing through electropolishing, etc., and even with an aluminum material manufactured without rolling, such as a cast piece, a visible macroscopic unevenness is generated after anodic oxidation, which is transcribed to a resin by a transcribing operation. Beside such remaining problems, Patent Document 1 has made no reference to a roll mold.

Under such circumstances, an object of the present invention is to provide a (roll) mold having a microscopic pattern not larger than the wavelength of visible light which can be formed by a simple production process, but without a joint line or a visible unevenness on the surface, a production process thereof and a process for producing a sheet having the microscopic pattern on the surface with a period not larger than the wavelength of visible light using the mold.

Means for Solving the Problems

The present inventors have intensively investigated to discover that there is no visible macroscopic unevenness in a mold characterized by comprising alumina having a microscopic pattern, in which distances between adjacent recesses or salients are not longer than wavelength of visible light, formed by anodic oxidation on a surface of an aluminum pre-mold without a rolling mark, wherein height or depth of a crystal grain boundary is 300 nm or less.

The present inventors have further discovered that a mold having a certain level of regular microscopic pattern not larger than the wavelength of visible light can be simply obtained by a process for producing the mold having the microscopic pattern on the surface, including a preparation of the pre-mold by polishing aluminum without a rolling mark or by forming an aluminum film on a substrate surface; a first formation of an oxide film with pores and thickness of 10 μm or less by anodic oxidation of surface aluminum of the pre-mold at a constant voltage; a removal of the entire oxide film; a second formation of an oxide film by anodic oxidation of surface aluminum of the pre-mold at a constant voltage; and an enlargement of the pore diameter by removing a part of the oxide film.

The present inventors have further discovered a process for producing a sheet having a microscopic pattern on a surface including filling an actinic energy ray curable composition between the mold produced according to the aforedescribed process and a transparent sheet, and curing by irradiation of the actinic energy ray followed by demolding, or curing by irradiation of the actinic energy ray after demolding.

Advantages of the Invention

According to the present invention, a mold having a microscopic pattern not larger than the wavelength of visible light without a joint line or a visible steric structure on the surface can be produced simply and easily, and a sheet having the microscopic pattern on the surface can be produced economically using the mold.

DESCRIPTION OF SYMBOLS

Figure 1:
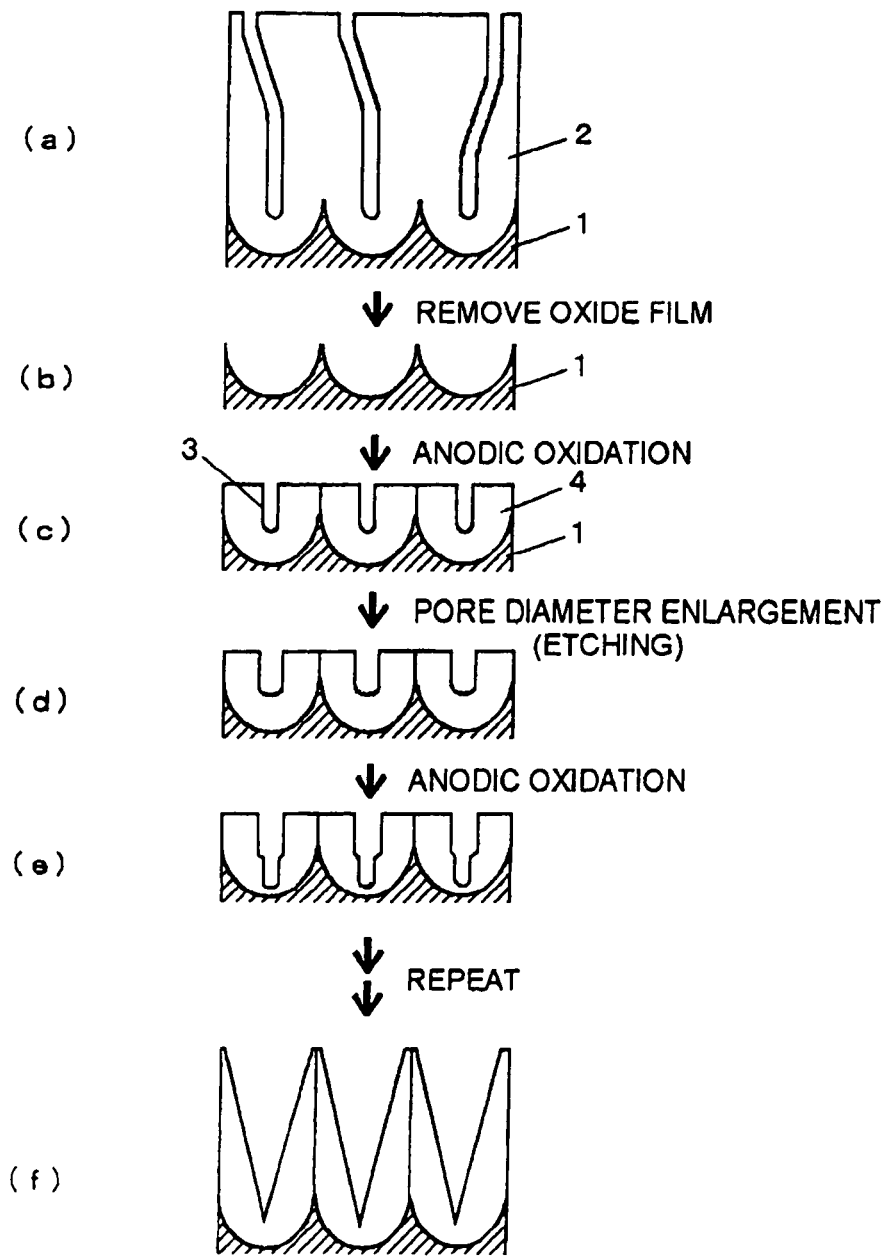
FIG. 1 is a diagram showing a process for shaping pores whose diameter decreases continuously from the opening in the depth direction by a combination of anodic oxidation and pore diameter enlargement.

1 Aluminum (pre-mold)
2 Anodic oxidized porous alumina
3 Pore
4 Oxide film by second anodic oxidation
11 Roll mold
12 Transparent sheet
13 Actinic energy ray curable composition
14 Sheet having microscopic pattern
15 Irradiation apparatus of actinic energy ray
16a Nip roll
16b Release roll
17 Tank
18 Pneumatic cylinder

BEST MODE FOR CARRYING OUT THE INVENTION

The present invention will be described in more detail below.
(Aluminum Pre-Mold)

The purity of aluminum to be used in the present invention is preferably 99.5% or higher, more preferably 99.8% or higher, and most preferably 99.99% or higher. In case the purity is below 99.5%, a steric structure with a size causing scattering of visible light may be formed by segregation of an impurity during anodic oxidation, or the regularity of pores formed by anodic oxidation may be decreased.

For the pre-mold of a flat mold, a plate may be cut from aluminum such as a cast piece free from a rolling mark, or an aluminum film may be formed on a planar substrate of another material. The cut plate of the cast piece is preferably used after mechanical polishing, chemical polishing or electrochemical polishing.

For the pre-mold of a roll mold, the pre-mold itself may be produced as a solid aluminum cylinder, a hollow aluminum cylinder may be overlaid on a support made of a different material, or an aluminum film may be formed by vapor deposition or sputtering on a solid or hollow cylindrical substrate made of a different material. Aluminum for the solid or hollow aluminum cylinder can be cut from a cast piece, or an extruded or drawn bar may be used. However, in case a solid or hollow aluminum cylinder is used as the pre-mold in the present invention, it is preferable to use a round bar cut from a cast piece free from a rolling mark and mechanically polished. The surface of the thus cut and polished solid or hollow cylindrical aluminum or the aluminum film formed on a separate substrate is preferably further subjected to a mirror-finish surface polishing treatment. Examples of the polishing treatment include chemical polishing, electrochemical polishing, physical polishing, and physicochemical polishing.
(Mold)

The steric structure of the mold of the present invention has a short period not larger than the wavelength of visible light. Thereby "not larger than the wavelength of visible light" means 400 nm or less. The period beyond 400 nm causes scattering of visible light and therefore is not suitable for an optical use such as an antireflection film.

In the mold of the present invention, a standard deviation of respective barycentric distances between an arbitrary recess (pore) and 6 recesses (pores) adjacent thereto in the microscopic pattern formed on the surface is 6.0 to 12.0, more preferably 6.0 to 9.6 and most preferably 7.5 to 9.6. In case the standard deviation is below 6.0, there causes such a problem that the transcribed product may exhibit a macroscopic unevenness at a crystal grain boundary deteriorating the appearance, and in case beyond 12.0, a flat area between adjacent recesses (pores) is formed, which forms a flat area between salients when transcribed from the mold, whose reflection deteriorates an antireflection property. The standard deviation can be determined according to the following method.

The surface of the mold is observed under a field emission scanning electron microscope (×50,000), and an obtained image of a visual field of 3.8 µm$^2$ is analyzed by a software such as "Image-Pro PLUS" (Nippon Roper Co., Ltd.) to determine barycentric coordinate values of the recesses (pores) in the microscopic pattern. Then an arbitrary recess (pore) is selected and 6 recesses (pores) adjacent thereto are selected and the standard deviation of the coordinate distances is determined. The procedure is repeated at arbitrary 3 locations of the mold each for 10 recesses, and the mean value is used as "a standard deviation of respective barycentric distances between an arbitrary recess (pore) and 6 recesses adjacent thereto in the microscopic pattern". The standard deviation becomes an index for regularity of the microscopic pattern.

The optimal shape of the microscopic pattern or the salient height of the mold may vary depending on an end use of a sheet having a microscopic pattern on the surface produced with the mold.

Figure 2:
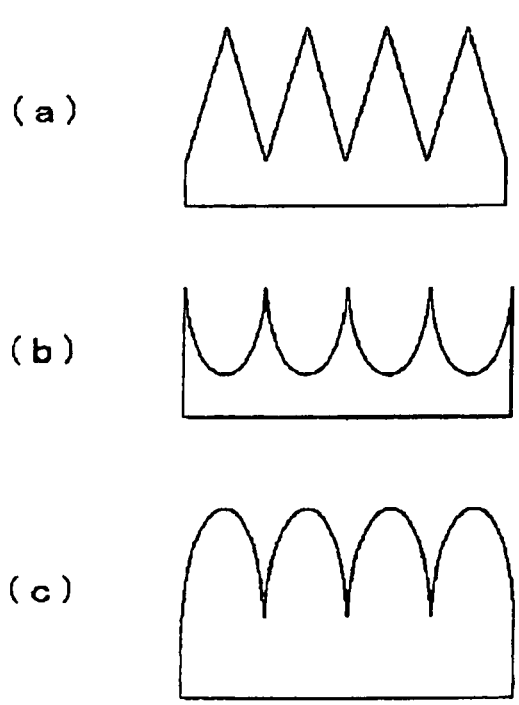
FIG. 2 is a diagram showing examples of the pore shapes obtained by changing an anodic oxidation time and a pore diameter enlargement time according to the process of FIG. 1.

As shapes of the pore in the steric structure of the mold continuously decreasing in the diameter from the opening in the depth direction, a conical shape, a reverse bell shape, or an acuminate shape as shown in FIG. 2 may be exemplified. The surface on which the microscopic pattern of the mold is transcribed constitutes a so-called moth-eye structure and therefore an effective antireflection means. The height (depth) of the microscopic pattern of the mold is preferably 50 nm or larger, and more preferably 100 nm or larger. In case it is 50 nm or larger, the reflectance of the transcribed product decreases. The aspect ratio (=height/period) is preferably 0.5 or larger, and more preferably 1 or larger. In case it is 0.5 or larger, the reflectance of the transcribed product can be low and dependence on an angle of incidence can be small, and therefore a higher value is preferable.

Although a case in which a pore shape changes in the depth direction is described above, with a sheet transcribed by a mold having cylindrical pores not subjected to the pore diameter enlargement treatment, a reflectance mitigating effect can be still expected owing to the steric structure constituting a low reflectance layer.

The height or depth of a crystal grain boundary in the mold of the present invention is 300 nm or less, more preferably 250 nm or less, and most preferably 180 nm or less. In case it is beyond 300 nm, a crystal grain boundary of aluminum becomes visible and by transcription, unevenness due to the crystal grain boundary is also transcribed onto the resin surface and the appearance is deteriorated.

The height or depth of the aforementioned crystal grain boundary can be determined according to the following method. The surface of the mold is observed with a scanning white-light interferometer 3D-Surface Profiler System ("New View 6300" by Zygo Corp.) and combining the visual fields to form a 10 mm-square observation results. Out of the 10 mm-square area 10 bumps at crystal grain boundaries are arbitrarily selected and the height (depth) thereof were measured. The mean value thereof was used as "the unevenness height (depth) of a crystal grain boundary".

The surface of the mold of the present invention may be treated with a mold release agent to facilitate demolding. Although there is no particular restriction on the treatment method, coating of a silicone polymer or a fluorinated polymer, vapor depositing of a fluorine compound, and coating of a silane coupling agent, such as a fluorine type or fluorinated silicone type, may be exemplified.

The mold of the present invention can be easily formed into a roll mold that exhibits higher productivity. Since the roll mold of the present invention has no joint line or visible unevenness on the surface, the transcribed product can be obtained at a high yield and consequently economically.

(Process for Producing a Mold)
(Anodic Oxidation)

The regularity of pores on the surface of the aluminum pre-mold can be improved by anodic oxidation in an acidic electrolytic solution at a constant voltage followed by removal of the oxide film and use of the remainder as originating points for pores during the next anodic oxidation (e.g. Masuda, Oyo Buturi, vol. 69, No. 5, p. 558 (2000)). Herein the anodic oxidation to prepare regular originating points for pores is referred to as the "first anodic oxidation", and the formation of an oxide film by this anodic oxidation is referred to as the "first formation of an oxide film". The anodic oxidation after the removal of the oxide film is referred to as the "second anodic oxidation", and the formation of an oxide film by this anodic oxidation is referred to as the "second formation Of an oxide film".

The first anodic oxidation will be described below.

As the acidic electrolytic solution, sulfuric acid, oxalic acid and a mixture thereof may be exemplified.

Far example, when oxalic acid is used in an electrolytic solution, its concentration is preferably 0.7 M or less. In case it is beyond 0.7 M, the surface may be roughened due to an excessive current. When the anodization voltage is 30 to 60 V, an oxide film (hereinafter referred to as porous alumina) having pores with the highly regular period of 100 nm can be obtained. If the anodization voltage is too high or too low compared to the above range, the regularity tends to decrease, and a steric structure larger than the wavelength of visible light may be formed. The temperature of the electrolytic solution during the anodic oxidation reaction is preferably 60° C. or lower, and more preferably 45° C. or lower. In case it is beyond 60° C., a so-called 'burning' phenomenon may take place and the structure may be destroyed or the surface may melt to disrupt regularity.

When sulfuric acid is used in an electrolytic solution, its concentration is preferably 0.7 M or less. In case it is beyond 0.7 M, the current may become too high to control the voltage at a constant level. When the anodization voltage is 25 to 30 V, an oxide film having pores with the highly regular period of 63 nm can be obtained. If the anodization voltage is too high or too low compared to the above range, the regularity tends to decrease, and a steric structure larger than the wavelength of visible light may be formed. The temperature of the electrolytic solution during the anodic oxidation reaction is preferably 30° C. or lower, and more preferably 20° C. or lower. In case it is beyond 30° C., a so-called "burning" phenomenon may take place and the structure may be destroyed or the surface may melt to disrupt regularity.

The thickness of the oxide film formed by the anodic oxidation, in the aforementioned electrolytic solution and at the aforementioned anodization voltage, of the aluminum in a solid or hollow cylinder form, or at least the aluminum existing on the surface in such a form according to the present invention is preferably 10 μm or less, more preferably 1 to 5 μm, and most preferably 1 to 3 μm when observed with a field emission scanning electron microscope. In case the thickness of the oxide film is 10 μm or lower, a crystal grain boundary of aluminum cannot be recognized visually, and when transcribed, transcription of an unevenness of the crystal grain boundary onto the resin surface can be prevented.

The porous alumina film of the present invention is removed once to prepare the pore originating points. Although there is no particular restriction on a method for removing the porous alumina film, a method of dissolving alumina by a selective solution that does not dissolve aluminum may be exemplified, and for example a mixture liquid of chromic acid/phosphoric acid is used. By continuing the anodic oxidation for a considerably long time, the pore arrangement in the anodic oxidized porous alumina film can be regularized. However, as described above, in case the thickness of the oxide film exceeds 10 μm, the macroscopic unevenness due to a crystal grain boundary becomes obvious, and therefore it is preferable to adjust the anodic oxidation time to limit the oxide film thickness to 10 μm or less at the first anodic oxidation for regularization of the pore arrangement. By removing the entire alumina film thus formed by the first anodic oxidation, a considerably regular dimple arrangement on the aluminium surface corresponding to the bottom of the porous alumina (called as a barrier layer) can be obtained, and by the following combination of the anodic oxidation and the pore diameter enlargement, the porous alumina having regularly arranged tapered pores decreasing the diameter from the top surface can be formed.

Next, the second anodic oxidation will be described below.

After removal of the first anodic oxidation film, the second anodic oxidation is carried out to obtain cylindrical pores. The anodic oxidation is carried out with the same ranges of the electrolytic solution concentration and the electrolytic solution temperature, and with substantially the same anodization voltage, as the first anodic oxidation. Although the deeper pores can be formed with the longer oxidation time, it is not necessary to form the oxide film by the second anodic oxidation as thick as in the first anodic oxidation.

By repeating the anodic oxidation and the pore diameter enlargement, the pores with a shape whose diameter decreases continuously from the opening in the depth direction can be obtained. The pore diameter enlargement is to enlarge the diameter of the pores obtained by the anodic oxidation by dipping in a solution that dissolves alumina, but not to remove the entire oxide film as in the removal of the first anodic oxidation film. As the solution to dissolve alumina, an about 5% aqueous phosphoric acid solution is used. The pore shape varies depending on the conditions of the anodic oxidation and the pore diameter enlargement, and the repeating anodic oxidation is conducted with the same ranges of the electrolytic solution concentration and the electrolytic solution temperature, and with substantially the same anodization voltage, as in the first anodic oxidation. With the longer anodic oxidation time the pores become deeper, and with the longer pore diameter enlargement time the pore diameter becomes larger. Although the mold can be produced according to the present invention by repeating the second anodic oxidation and the pore diameter enlargement without conducting the first anodic oxidation, it is preferable from the viewpoint of the regularity of the formed pores to conduct the first anodic oxidation, to remove once the entire oxide film thus formed, and then to repeat the second anodic oxidation and the pore diameter enlargement.

FIG. 1 shows a process of the present invention for producing the anodic oxidized porous alumina whose pore is taper-shaped. As shown in step (a) of FIG. 1, anodic oxidized porous alumina 2 with the thickness of 10 μm or less is formed (the first anodic oxidation) on the surface of aluminum (pre-mold) 1. Then as shown in step (b) of FIG. 1, formed porous alumina 2 is removed entirely to form regular pore originating points. Next, by the second anodic oxidation, oxide film 4 by second anodic oxidation is generated. Pores 3 of oxide film 4 by second anodic oxidation are virtually cylindrical and use thereof without modification as the mold for producing a sheet having good antireflection effect is difficult. In the present invention, production of the anodic oxidized porous alumina having pores of a desired tapered shape can be attained by a combination of the anodic oxidation and the pore diameter enlargement by etching. After conducting the anodic oxidation for the predetermined time period to form pores with a desired depth (step (c) of FIG. 1), the pore diameter enlargement is conducted by dipping the work in an appropriate solution dissolving alumina (step (d) of FIG. 1). Then the anodic oxidation is carried out again to form pores with smaller diameter (step (e) of FIG. 1) than in step (c). By repeating the procedure, the anodic oxidized porous alumina whose pore is taper-shaped can be obtained (step (e of FIG. 1). Thereby, by increase in a repetition cycle number, the smoother tapered shape can be obtained. By adjusting the anodic oxidation time and the pore diameter enlargement time, pores with various tapered shapes can be prepared, so that optimal refractive index change depending on the period and pore depth can be designed. Thereby, by repeating the anodic oxidation and the pore diameter enlargement under the same conditions, the shape shown in FIG. 2(a) can be obtained, and by changing the anodic oxidation time and the pore diameter enlargement time, the shapes shown in FIGS. 2(b) and (c) can be obtained. The repetition cycle number of steps (d) and (e) is preferably 3 or more, and more preferably 5 or more. In case it is 2 or less, the pore diameter decreases stepwise, which gives inferior reflectance decreasing effect, when the transcribed product is used for antireflection purpose.

(Roll Mold)

According to the production process of the present invention as described above, a large area mold or a roll mold without a joint line on the surface can be produced without difficulty and no visible steric structure is formed.

(Process for Producing Sheet)

With the mold produced according to the process of the present invention, a sheet having the microscopic pattern on the surface can be produced. For producing a sheet having the microscopic pattern on the surface, a actinic energy ray curable composition is filled between the mold produced according to the present invention and a transparent sheet, and cured by irradiation of the actinic energy ray followed by demolding, or the steric structure of the mold is transcribed onto the actinic energy ray curable composition, which is then demolded and irradiated by the actinic energy ray for curing.

There is no particular restriction on the transparent sheet to be used according to the present invention, insofar as it does not substantially retard irradiation of the actinic energy ray, because the actinic energy ray irradiation is conducted through the sheet. Examples thereof include methyl methacrylate (co)polymers, polycarbonates, styrene (co)polymers, methyl methacrylate-styrene copolymers, cellulose diacetates, cellulose triacetates, cellulose acetate butyrates, polyesters, polyamides, polyimides, polyether sulfones, polysulfones, polypropylenes, polymethylpentenes, polyvinylchlorides, polyvinyl acetals, polyetherketones, polyurethanes, and glass. The sheet may be a sheet or a film, and coated or treated by corona discharge on the surface for improving tight contact, antistatic property, abrasion-resistance or weather resistance.

Specific examples of the actinic energy ray according to the present invention include visible light, a UV ray, an electron beam, plasma, and a heat ray such as an infrared ray.

The actinic energy ray curable composition according to the present invention is an appropriate mixture of monomers having a radically polymerizable bond and/or a cationically polymerizable bond in the molecule, oligomers and reactive polymers, and a nonreactive polymer may be added. Further an actinic energy ray inducible sol-gel reaction composition may be used.

There is no particular restriction on a monomer having a radically polymerizable bond, and examples thereof include, as monofunctional monomers: (meth)acrylate derivatives, such as methyl(meth)acrylate, ethyl (meth)acrylate, propyl (meth)acrylate, n-butyl(meth)acrylate, i-butyl (meth)acrylate, s-butyl(meth)acrylate, t-butyl(meth)acrylate, 2-ethylhexyl (meth)acrylate, lauryl(meth)acrylate, alkyl(meth)acrylate, tridecyl (meth)acrylate, stearyl(meth)acrylate, cyclohexyl(meth)acrylate, benzyl (meth)acrylate, phenoxyethyl(meth)acrylate, isobornyl(meth)acrylate, glycidyl (meth)acrylate, tetrahydrofurfuryl(meth)acrylate, allyl (meth)acrylate, 2-hydroxyethyl(meth)acrylate, hydroxypropyl(meth)acrylate, 2-methoxyethyl (meth)acrylate, and 2-ethoxyethyl(meth)acrylate; (meth)acrylic acid; (meth)acrylonitrile; styrene derivatives, such as styrene, and α-methylstyrene; (meth)acrylamide derivatives, such as (meth)acrylamide, N-dimethyl (meth)acrylamide, N-diethyl(meth)acrylamide, and dimethylaminopropyl (meth)acrylamide; as bifunctional monomers: ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentylglycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, ethylene oxide-added bisphenol A di(meth)acrylate, propylene oxide-added bisphenol A di(meth)acrylate, hydroxypivalic acid neopentylglycol di(meth)acrylate, divinylbenzene, and methylenebisacrylamide; as trifunctional monomers: pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, and isocyanuric acid ethylene oxide-modified tri(meth)acrylate; as polyfunctional monomers: a reaction mixture of condensation products of succinic acid/trimethylolethane/acrylic acid, dipentaerythtol hexa(meth)acrylate, dipentaerythtol penta(meth)acrylate, ditrimethylol propane tetraacrylate, and tetramethylol methane tetra(meth)acrylate; a bi- or higher functional urethane acrylate; and a bi- or higher functional polyester acrylate. These may be used singly or in a combination of two of more thereof.

There is no particular restriction on a monomer having a cationically polymerizable bond, and monomers with an epoxy group, an oxetanyl group, an oxazolyl group, and a vinyloxy group may be exemplified, and among them a monomer with an epoxy group is preferable.

Examples of the oligomers and the reactive polymers include unsaturated polyesters such as condensates of an unsaturated dicarboxylic acid and a polyhydric alcohol, polyester (meth)acrylates, polyether (meth)acrylates, polyol (meth)acrylates, epoxy(meth)acrylates, urethane (meth)acrylates, cationic polymerizable epoxy compounds, and homo- or copolymers of the aforedescribed monomers having a radically polymerizable bond in a side-chain.

Examples of the nonreactive polymer include acrylic resins, styrenic resins, polyurethane resins, cellulosic resins, polyvinyl butyral resins, polyester resins, and thermoplastic elastomers.

Examples of the actinic energy ray inducible sol-gel reaction composition include, but not limited thereto, alkoxysilane compounds and alkyl silicate compounds.

The alkoxysilane compounds are represented by $R_xSi(OR')_y$, wherein R and R' represent C1 to C10 alkyl groups, and x and y are integers satisfying the relationship of x+y=4. Specific examples include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane.

The alkyl silicate compounds are represented by $R^1O[Si(OR^3)(OR^4)O]_zR^2$, wherein $R^1$ to $R^4$ independently represent C1 to C5 alkyl groups, z represents an integer of 3 to 20. Specific examples include methyl silicate, ethyl silicate, isopropyl silicate, n-propyl silicate, n-butyl silicate, n-pentyl silicate, and acetyl silicate.

Into the actinic energy ray curable composition, a polymerization initiator is added for curing. There is no particular restriction on the polymerization initiator, and publicly known initiators can be used.

In case a photoreaction is applied, examples of the photo initiator include: carbonyl compounds, such as benzoin, benzoin methyl ether, benzoin ethyl ether, benzoin isopropyl ether, benzoin isobutyl ether, benzil, benzophenone, p-methoxy-benzophenone, 2,2-diethoxyacetophenone, α,α-dimethoxy-α-phenyl acetophenone, methylphenyl glyoxylate, ethylphenyl glyoxylate, 4,4'-bis-(dimethylamino) benzophenone, and 2-hydroxy-2-methyl-1-phenyl-propan-1-one; sulfur compounds, such as tetramethylthiuram monosulfide and tetramethylthiuram disulfide; 2,4,6-trimethylbenzoyl-diphenyl-phosphine oxide; and benzoyl diethoxyphosphine oxide. These may be used singly or in a combination of two of more thereof.

In case an electron beam curing reaction is utilized, examples of the polymerization initiator include: benzophenone, 4,4-bis(diethyl amino)benzophenone, 2,4,6-trimethylbenzophenone, methyl orthobenzoyl benzoate, 4-phenylbenzophenone, t-butylanthraquinone, 2-ethylanthraquinone; thioxanthones, such as 2,4-diethylthioxanthone, isopropylthioxanthone and 2,4-dichlorothioxanthone; acetophenones, such as dlethoxyacetophenone, 2-hydroxy-2-methyl-1-phenylpropan-1-one, benzyldimethylketal, 1-hydroxycyclohexyl-phenylketone, 2-methyl-2-morpholino(4-thiomethylphenyl)propan-1-one, and 2-benzyl-2-dimethylamino-1-(4-morpholinophenyl)butanone; benzoin ethers, such as benzoin methyl ether, benzoin ethyl ether, benzoin isopropyl ether, and benzoin isobutyl ether; acylphosphine oxides, such as 2,4,6-trimethylbenzoyl diphenyl phosphine oxide, bis(2,6-dimethoxybenzoyl)-2,4,4-trimethylpentyl phosphine oxide, and bis(2,4,6-trimethylbenzoyl)-phenyl phosphine oxide; methylbenzoyl formate; 1,7-bisacrydinylheptane; and 9-phenylacrydine.

These may be Used singly or in a combination of two of more thereof. In case a thermal reaction is utilized, specific examples of the thermal polymerization initiator include: organic peroxides, such as methyl ethyl ketone peroxide, benzoyl peroxide, dicumyl peroxide, t-butyl hydroperoxide, cumene hydroperoxide, t-butyl peroxyoctoate, t-butyl peroxybenzoate, and lauroyl peroxide; azo compounds such as azobisisobutyronitrile; and redox polymerization initiators obtained by combining the organic peroxide with amines, such as N,N-dimethylaniline and N,N-dimethyl-p-toluidine.

The content of the polymerization initiator is 0.1 to 10 parts by mass with respect to 100 parts by mass of the actinic energy ray curable composition. In case it is below 0.1 parts by mass, the polymerization occurs hardly, and in case it is beyond 10 parts by mass, the cured polymer may be discolored or its mechanical strength may be compromised.

To the actinic energy ray curable composition, additives, such as an antistatic agent, a mold releasing agent and a fluorine compound for improving an antifouling property; fine particles; or a small amount of a solvent may be added in addition to the aforedescribed components.

As a process for producing a sheet having on the surface a microscopic pattern with a period not larger than the wavelength of visible light by using the mold produced according to the present method, the transparent sheet, and the actinic energy ray curable composition: (1) a process, by which the actinic energy ray curable composition is filled between the mold and the transparent sheet, cured by irradiation of the actinic energy ray, and then demolded, and (2) a process, by which the solid state actinic energy ray curable composition coated on the transparent sheet is pressed by the mold to form the microscopic pattern, demolded and then cured by the actinic energy ray, can be exemplified.

As a filling method for (1), a method, by which the actinic energy ray curable composition fed between the mold and the transparent sheet is extended by a nip roll and filled; a method, by which the actinic energy ray curable composition is coated on the mold and laminated with the transparent sheet; and a method, by which the actinic energy ray curable composition is coated on the transparent sheet in advance and laminated with the mold, can be exemplified.

The pressing conditions for (2), although not limited thereto, are exemplified as follows. The temperature is preferably 50 to 250° C., more preferably 50 to 200° C., and most preferably 50 to 150° C. In case it is below 50° C., the microscopic pattern can be hardly transcribed, and in case it is beyond 250° C., discoloration or thermal decomposition may take place. The pressure is preferably 0.1 to 15 MPa, more preferably 0.5 to 10 MPa, and most preferably 1 to 5 MPa. In case it is below 0.1 MPa, the microscopic pattern can be hardly transcribed, and in case it is beyond 15 MPa, the durability of the mold may be questioned. In either process, the composition may be additionally irradiated by the actinic energy ray or heat-treated after demolding.

Irradiation of the actinic energy ray is conducted, for example, by a high-pressure mercury lamp. Although there is no particular restriction on the quantity of the light irradiation energy insofar as curing of the actinic energy ray curable composition occurs, the energy quantity is preferably 100 to 10,000 $mJ/cm^2$.

Figure 3:
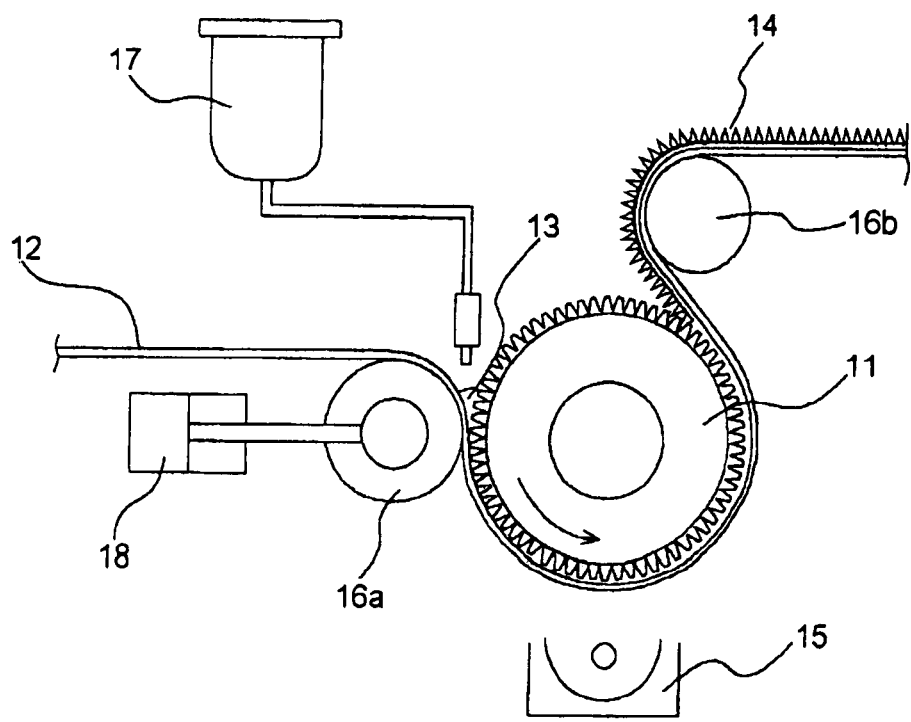
FIG. 3 is a schematic diagram showing an example of an apparatus for producing continuously a sheet having a microscopic pattern using the roll mold of the present invention.

FIG. 3 is a schematic diagram showing an example of an apparatus for producing a sheet having a microscopic pattern using the roll mold as an embodiment of the present invention. In FIG. 3, symbol 11 is the roll mold produced according to the process of the present invention, and actinic energy ray curable composition 13 is fed from tank 17 between roll mold 11 and transparent sheet 12, nipped by nip roll 16a at the pressure regulated by pneumatic cylinder 18 so that actinic energy ray curable composition 13 is filled in recesses of roll mold 11. Irradiation apparatus of actinic energy ray 15 is installed beneath roll mold 11, which irradiates the actinic energy ray through transparent sheet 12 onto composition 13, so that composition 13 cures by crosslinking, bonds to transparent sheet 12, and is transcribed with the steric structure of roll mold 11. Sheet having microscopic pattern 14 is released from roll mold 11 by release roll 16b and conveyed to right in the figure. Thus, a sheet having the microscopic pattern is produced.

(Use)

The sheet material having a microscopic pattern produced according to the process of the present invention is expected to be applicable to optical articles, such as an antireflection film, an antireflection coat, antireflection parts, an optical-waveguide, a relief hologram, a lens, and a polarization splitting element; a sheet for cell culture; a super-water repellent film; and a super-hydrophilic film; and is especially suitable for use as an antireflection film, an antireflection coat and antireflection parts. Specific examples of use of an antireflection film, an antireflection coat and antireflection parts include image display devices, such as a liquid crystal display device, a plasma display panel, an electroluminescence display panel, a cathode tube display device; and an antireflection coat, an antireflection film or an antireflection sheet for a surface of a lens, a show window, a display case, an indicator panel, an indicator cover and eye-glasses. At an image display device, the antireflection film may be bonded to the top surface, or the antireflection coat is directly formed on the material forming the top surface or on the front panel. The sheet material having a microscopic pattern produced according to the present invention is suitable for a large area use, such as an antireflection coat for a large-sized display, a show window, and a display case.

The haze of the antireflection sheet of the present invention is preferably 3% or less, more preferably 1% or less, and most preferably 0.5% or less. In case it is beyond 3%, when used in, for example, an image display device, the sharpness of the image is unfavorably compromised.

The antireflection sheet may have an anti-glare function to scatter outside light. The anti-glare function can be imparted by superposing a microscopic pattern not larger than the wavelength of visible light of the present invention on the surface of the steric structure not smaller than the wavelength of visible light.

EXAMPLES

Examples of the present invention are described below, provided that the present invention is not limited thereto. The physical properties in the examples were measured according to the following methods.

(1) Oxide Film Thickness, Pore Shape and Microscopic Pattern Shape on Resin

A flake of the mold was cut out, and the section was deposited with Pt for 1 min and observed under a field emission scanning electron microscope (JSM-7400F by JEOL Ltd.) at an acceleration voltage of 3.00 kV to measure the oxide film thickness, the pore period, the opening, the bottom and the pore depth. The fracture surface of the resin was deposited with Pt for 5 min, and was observed similarly to measure the period, the salient height, the salient top diameter, and the salient base diameter.

(2) Unevenness Height (Depth) of Crystal Grain Boundary

The surface of the mold was observed with a scanning white-light interferometer 3D-Surface Profiler System (New View 6300 by Zygo Corp.) using a 2.5× objective lens and a 0.5× zoom lens, and the visual fields were combined to form a 10 mm-square observation results. Out of the 10 mm-square area 10 bumps at crystal grain boundaries are arbitrarily selected and the height (depth) thereof were measured. The mean value thereof was used as the height (depth) of a crystal grain boundary.

(3) Regularity

The surface of the mold was observed under a field emission scanning electron microscope (×50,000), and an obtained image of a visual field of 3.8 $\mu m^2$ was analyzed by the image analysis software 'Image-Pro PLUS' (Trade name: Nippon Roper Co., Ltd.) to determine barycentric coordinate values of the recesses (pores) in the microscopic pattern. Then an arbitrary recess (pore) was selected and arbitrary 6 recesses (pores) adjacent thereto were selected and the standard deviation of the barycentric distances from the first arbitrarily selected recess was determined. The procedure was repeated at arbitrary 3 locations of the mold each for 10 recesses, and the mean value was determined as the standard deviation and used as an index for regularity.

(4) Reflectance Measurement

The backside of a transcribed sample was painted black, and the relative reflectance was measured by a spectrophotometer (U-4000 by Hitachi High-Technologies Corporation) using an incident angle of 5° and a wavelength range of 380 to 780 nm.

(5) Film Appearance

A transcribed film was observed visually and if a visible macroscopic unevenness was recognized, the film was rated as "poor", and if not recognized, rated as "good".

The following composition was used for the actinic energy ray curable composition.

| (Actinic energy ray curable composition A) | |
|---|---|
| Condensation ester of succinic anhydride/ trimethylolethane acrylic acid | 40 parts by mass |
| Hexanediol diacrylate | 40 parts by mass |
| "x-22-1602" (Trade name: Shin-Etsu Chemical Co., Ltd.) | 10 parts by mass |
| "Irgacure 184" (Trade name: Ciba Specialty Chemicals Inc.) | 2.7 parts by mass |
| "Irgacure 819" (Trade name: Ciba Specialty Chemicals Inc.) | 0.18 parts by mass |

Example 1

Production of Flat Mold

Out of 99.99% purity aluminum billet, an aluminum disk with 2 mm thickness and 75 mm diameter was machined, buff-treated and electropolished. The mirror-finished aluminum disc was subjected to an anodic oxidation in a 0.3% aqueous oxalic acid solution under the conditions of the bath temperature at 17° C. DC 40 V for 30 min to form the first oxide film. The formed oxide film was removed once by dissolution in a mixed aqueous solution of 6 mass-% phosphoric acid and 1.8 mass-% chromic acid, and another anodic oxidation was conducted under the same conditions for 30 sec. The disc was then dipped in a 5 mass-% phosphoric acid at 30° C. for 8 min for pore diameter enlargement. The procedures were repeated 5 times to obtain a mold having taper-shaped pores with the period of 100 nm, the pore diameter at the opening of 85 nm, the same at the bottom of 40 nm, and the pore depth of 220 nm.

The obtained mold was dipped in a 0.5 mass-% solution of KBM-7803 (Trade name: Shin-Etsu Chemical Co., Ltd.) for 10 min, air-dried for 20 min and then heat-treated at 120° C. for 2 hours to impart releasing property.

Between the thus obtained mold and a PET film (A4300: Trade name of Toyobo Co., Ltd.), actinic energy ray curable composition A was filled and irradiated by UV light from a high-pressure mercury lamp to a total irradiated light quantity of 3,000 mJ/cm$^2$ and a film having the microscopic pattern was obtained.

The obtained film had the microscopic pattern with the period of 100 nm, the salient height of 200 nm, the salient top diameter of 40 nm, and the salient base diameter of 85 nm.

With respect to the obtained mold, the first oxide film thickness, the height of crystal grain boundary, the regularity, the reflectance of the transcribed film and the visual appearance are shown in Table 1.

Example 2

Production of Flat Mold

The mold and the film having the microscopic pattern were produced identically as in Example 1, except that the first anodic oxidation was conducted for 60 min. With respect to the obtained mold, the first oxide film thickness, the height of crystal grain boundary, the regularity, the reflectance of the transcribed film and the visual appearance are shown in Table 1.

Example 3

Production of Flat Mold

The mold and the film having the microscopic pattern were produced identically as in Example 1, except that the first anodic oxidation was conducted for 80 min. With respect to the obtained mold, the first oxide film thickness, the height of crystal grain boundary, the regularity, the reflectance of the transcribed film and the visual appearance are shown in Table 1.

Example 4

Production of Flat Mold

The mold and the film having the microscopic pattern were produced identically as in Example 1, except that the first anodic oxidation was conducted in a 0.5 M aqueous oxalic acid solution for 1 min. With respect to the obtained mold, the first oxide film thickness, the height of crystal grain boundary, the regularity, the reflectance of the transcribed film and the visual appearance are shown in Table 1. The height of crystal grain boundary was too low to be measured.

Example 5

Production of Roll Mold

An aluminum round bar cut out of a 99.99%-purity aluminum slab with an outer diameter of 75 mm was processed identically as in Example 1 except that the second anodic oxidation time was 15 sec, and the dipping conditions in the phosphoric acid were 30° C. and 3 min, to obtain a roll mold having tapered pores with the period of 100 nm, the pore diameter at the opening of 80 nm, the same at the bottom of 25 nm, and the pore depth of 300 nm. Any bump at crystal grain boundary was not visible.

The obtained roll mold was spray-coated with a mold releasing agent (Novec EGC-1720: Trade name of Sumitomo 3M Limited), air-dried at room temperature for 30 min, and then used.

The roll mold treated with the mold releasing agent was dipped in a photo-curing resin (PAK-01: Trade name of Toyo Gosei Co., Ltd.) to be coated by a 500 μm-thick polyethylene terephthalate film, which was cured by irradiation of UV light thereon to the energy of 8,000 mJ/cm$^2$. Thereafter by releasing the film from the roll mold, the film having the microscopic pattern with the period of 100 nm, the salient height of 300 nm, the salient top diameter of 25 nm, and the salient base diameter of 80 nm was obtained. No macroscopic steric structure was visible on the surface.

Example 6

A roll mold was produced identically as in Example 4, except that the roll was a hollow cylinder with the outer diameter of 200 mm and the inner diameter of 155 mm, to obtain a roll mold in which any bump at crystal grain boundary was not recognizable.

The obtained roll mold was dipped in a 0.3 mass-% m-xylene hexafluoride solution of KP-801M (Trade name of Shin-Etsu Chemical Co.) for 30 min, air-dried for 1 hour and heat-treated at 120° C. for 2 hours.

The roll mold was overlaid onto a core roll made of a carbon steel for machine structural use equipped with a cooling water channel therein to complete roll mold 11 in FIG. 3.

Actinic energy ray curable composition A was used as actinic energy ray curable composition 13.

Actinic energy ray curable composition 13 was fed at room temperature from tank 17 through a feeding nozzle onto PET film 12 (A4300: Trade name of Toyobo Co., Ltd.) nipped between nip roll 16a and roll mold 11.

Rotating roll mold 11 at the speed of 4.0 m/min, a UV ray was irradiated from UV irradiation apparatus 15 with the power of 240 W/cm to actinic energy ray curable composition 13 sandwiched between roll mold 11 and PET film 12 to cure and mold the actinic energy ray curable composition 13, followed by releasing from roll mold 11 to obtain sheet 14 having the microscopic pattern.

The film having the microscopic pattern with the period of 100 nm, the salient height of 160 nm, the salient top diameter of 25 nm, and the salient base diameter of 80 nm was obtained. The reflectance of the obtained film having the microscopic pattern is shown in Table 1.

Comparative Example 1

A mold and a film having the microscopic pattern were produced identically as in Example 1, except that the first anodic oxidation was conducted for 120 min. With respect to the obtained mold, the first oxide film thickness, the height of crystal grain boundary, the regularity, the reflectance of the transcribed film and the visual appearance are shown in Table 1.

TABLE 1

| Example | Mold form | 1st Anodic oxidation time (min) | 1st Oxide film thickness (μm) | Height of crystal grain boundary (nm) | Regularity (standard deviation) | Film visual appearance | Reflectance (%) |
|---|---|---|---|---|---|---|---|
| Example 1 | Flat | 30 | 3 | 131 | 8.5 | good | 0.39-0.5 |
| Example 2 | Flat | 60 | 5 | 156 | 7.6 | good | 0.37-0.53 |
| Example 3 | Flat | 80 | 9 | 233 | 6.1 | good | 0.4-0.5 |
| Example 4 | Flat | 1[1)] | 0.1 | unmeasurable | 12.7 | good | 1.1-1.5 |
| Example 5 | Roll | 30 | 3 | not measured | not measured | good | not measured |
| Example 6 | Roll | 30 | not measured | not measured | not measured | good | 0.56-1.01 |
| Comparative Example 1 | Flat | 120 | 14 | 327 | 5.7 | poor | 0.4-0.5 |

[1)]In an aqueous 0.5 M oxalic acid solution

INDUSTRIAL APPLICABILITY

The sheet material having a microscopic pattern produced according to the process of the present invention is expected to be applicable to optical articles, such as an antireflection film, an antireflection coat, antireflection parts, an optical-waveguide, a relief hologram, a lens, and a polarization splitting element; a sheet for cell culture; a super-water repellent film; and a super-hydrophilic film; and is especially suitable for use as an antireflection film, an antireflection coat and antireflection parts.

The invention claimed is:

1. A large area alumina mold having a microscopic pattern, the mold prepared by a process comprising steps of:
   preparing a pre-mold by polishing an aluminum plate free from a rolling mark or by forming an aluminum film on a substrate surface;
   forming a first oxide film by subjecting surface aluminum of the pre-mold to a first anodic oxidation for a time adjusted to provide said first oxide film with a thickness of 10 μm or less;
   removing the first oxide film so as to leave regular pore originating points on a surface of remaining pre-mold aluminum;
   forming pores from the originating points by subjecting the surface of remaining pre-mold aluminum to a second anodic oxidation forming a second oxide film;
   removing a part of the second oxide film so as to enlarge pore diameter; and
   repeating the second anodic oxidation and the pore diameter enlargement so as to form regularly arranged tapered pores decreasing in diameter from a top surface thereof,
   wherein relative distances between adjacent pores of the alumina mold are not longer than a wavelength of visible light.

2. The large area mold according to claim 1, wherein the alumina mold comprises pre-mold aluminum remaining beneath an alumina surface.

3. The large area mold according to claim 2, wherein a height or depth of a crystal grain boundary of the remaining aluminum is 300 nm or less.

4. The large area mold according to claim 3, wherein the crystal grain boundary height or depth is determined over an average of 10 bumps arbitrarily selected in a 10-mm square observation area of the mold.

5. The large area mold according to claim 2, wherein a height or depth of a crystal grain boundary of the remaining aluminum is 250 nm or less.

6. The large area mold according to claim 2, wherein a height or depth of a crystal grain boundary of the remaining aluminum is 180 nm or less.

7. The large area mold according to claim 1, wherein a standard deviation of respective barycentric distances between an arbitrary pore and 6 pores adjacent thereto is 6.0 to 12.0.

8. The large area mold according to claim 1, wherein a standard deviation of respective barycentric distances between an arbitrary pore and 6 pores adjacent thereto is 6.0 to 9.6.

9. The large area mold according to claim 1, wherein a standard deviation of respective barycentric distances between an arbitrary pore and 6 pores adjacent thereto is 7.5 to 9.6.

10. The large area mold according to claim 1, wherein the pre-mold is an aluminum rod.

11. The large area mold according to claim 10, wherein the alumina mold is a roll mold.

12. The large area mold according to claim 10, wherein aluminum purity of the pre-mold is 99.5% or higher.

13. The large area mold according to claim 1, wherein aluminum purity of the pre-mold is 99.8% or higher.

14. The large area mold according to claim 1, wherein aluminum purity of the pre-mold is 99.99% or higher.

15. The large area mold according to claim 1, wherein a height or depth of the microscopic pattern is 50 nm or larger.

16. The large area mold according to claim 1, wherein a height or depth of the microscopic pattern is 100 nm or larger.

17. The large area mold according to claim 1, wherein the first oxide film has a thickness of 1 to 5 μm.

18. The large area mold according to claim 1, wherein the first oxide film has a thickness of 1 to 3 μm.

19. The large area mold according to claim 1, wherein the mold is used to transcribe the microscopic pattern so as to form an optical article.

20. The large area mold according to claim 19, wherein the optical article is an antireflection film, antireflection coat, antireflection part, optical waveguide, relief hologram, lens, or polarization splitting element.

21. The large area mold according to claim 1, wherein said removing of the first oxide film comprises removing the entire first oxide film.

* * * * *